United States Patent
Burch, Jr. et al.

(10) Patent No.: US 7,076,780 B2
(45) Date of Patent: Jul. 11, 2006

(54) APPLICATION PROGRAM INTERFACE FOR A COMPUTER PROGRAM

(75) Inventors: Charles Carroll Burch, Jr., Sandia Park, NM (US); William Meredith Menger, Houston, TX (US); Michael L. Sherrill, Newkirk, OK (US); Charles Ivan Burch, Ponca City, OK (US); Thomas R. Stoeckley, Ponca City, OK (US); Donna Kay Vunderink, Burbank, OK (US)

(73) Assignee: ConocoPhillips Company, Houston, TX (US)

( * ) Notice: Subject to any disclaimer, the term of this patent is extended or adjusted under 35 U.S.C. 154(b) by 701 days.

(21) Appl. No.: 09/951,184

(22) Filed: Sep. 13, 2001

(65) Prior Publication Data

US 2003/0051072 A1 Mar. 13, 2003

(51) Int. Cl.
*G06F 9/40* (2006.01)
*G06F 9/46* (2006.01)
*G06F 9/45* (2006.01)

(52) U.S. Cl. .................... 718/101; 719/315; 717/140
(58) Field of Classification Search .................. 707/1; 717/9, 140; 719/315; 711/200; 718/101
See application file for complete search history.

(56) References Cited

U.S. PATENT DOCUMENTS

| | | | |
|---|---|---|---|
| 5,109,497 A * | 4/1992 | Bolstad et al. .............. 711/200 |
| 5,150,474 A * | 9/1992 | Kaneko ....................... 717/138 |
| 5,721,925 A * | 2/1998 | Cheng et al. ................ 719/315 |
| 5,802,547 A | 9/1998 | Legvold ...................... 711/100 |
| 5,832,471 A * | 11/1998 | Fukui ............................. 707/1 |
| 6,144,889 A | 11/2000 | Kammler et al. ............. 700/86 |
| 6,247,174 B1 * | 6/2001 | Santhanam et al. ......... 717/154 |
| 6,253,374 B1 | 6/2001 | Dresevic et al. ............. 717/11 |
| 6,308,146 B1 | 10/2001 | La Cascia, Jr. et al. ...... 703/22 |

FOREIGN PATENT DOCUMENTS

| EP | 1 211 597 A2 | 6/2002 |
|---|---|---|
| WO | WO 00/38033 A2 | 6/2000 |

* cited by examiner

Primary Examiner—Meng-Al T. An
Assistant Examiner—Camquy Truong
(74) Attorney, Agent, or Firm—Hitchcock Evert LLP

(57) ABSTRACT

A computer program, and a method and apparatus for creating the computer program. The computer program is stored on a computer readable medium and is executable by a computer system. The computer system can comprise a front-end for interfacing with a user, and a back-end for performing batch functions. The computer program comprises instructions for performing a function, which requires at least one parameter for its operation. The computer program further comprises instructions for reading the parameter from a parameter cache in the computer system. The parameter cache is capable of storing the parameter as an object therein. The computer program also comprises instructions for validating the parameter and aborting the function if the parameter is not valid, and instructions for loading the parameter from the parameter cache and performing the function in accordance with the parameter if the parameter is valid.

13 Claims, 5 Drawing Sheets

APPLICATION PROGRAM INTERFACE FOR A COMPUTER PROGRAM

FIELD OF THE INVENTION

The present invention relates generally to computer software, and more particularly, to an application program interface for a computer program, and a method and apparatus for interfacing with the computer program.

BACKGROUND OF THE INVENTION

A computer program is a set of instructions or operations for a computer to perform. The computer program is typically stored on a computer readable medium accessible by the computer, such as a storage area or memory of the computer. The computer can retrieve an instruction from memory, perform the instruction, retrieve the next instruction, and so forth. The storage area can also contain data that is operated on by the instructions.

A computer program can be generally classified as an interactive program or as a batch program. An interactive program "interacts" with a user in that the program can require input from the user and can provide an output to the user. An example of an interactive program is a Web browser.

A batch program is designed to run without interaction with the user. A batch program can be started, for example, by a user through the use of an interactive program, or can be set to run automatically at a certain time. Once started, the batch program will run without requiring user interaction. Examples of batch programs include printing requests and certain computationally intensive numerical analysis programs.

A computer program is typically created in a high-level computing language, such as Fortran90, C, C++, etc. Statements written in the high-level computing language form a source code file, which can be compiled (by an appropriate compiler) into an object file. The source code file is a human-readable form of the computer program, while the object file is in a machine language. The machine language can be optimized to work with a particular computer architecture (e.g., a particular central processing unit (CPU) with its specific logic architecture and set of possible computer instructions). Alternatively, the machine language can be designed to run on any computer platform having the appropriate interpreter (e.g., Java virtual machine).

Many applications require the use of both interactive and batch programs. For example, in the data processing arena, an interactive program can be used in a front-end to interface directly with a user. A batch program can then be run in the back-end to perform the actual data processing functions requested by the user. The front-end program can interact directly with the back-end program or can use an intermediate program (e.g., an application program interface (API)) that mediates the front-end and back-end activities. The front-end program and the back-end program can be running on computers that are remotely located with respect to each other, or can be running on the same computer system.

The front-end program and the back-end program are required to interact with each other, such that the user's instructions to the front-end program are carried out by the back-end program. The front-end program and the back-end program, however, are different programs, which are often written by different programmers. For example, the front-end program can be designed to operate with a graphical user interface (GUI) to provide for ease of interfacing with a user. Thus, a programmer familiar with the intricacies of the GUI may be employed to write the front-end program. The back-end program, however, needs no user interface, as it typically interacts with either the front-end program or an API.

In some cases, it can be beneficial for the front-end program to perform some of the same functions as the back-end program. However, when a modification is desired to be made to a function performed by the program (e.g., due to an improvement in a process algorithm), both the front-end program and the back-end program must be modified, along with the corresponding GUI file, documentation file, etc.

A software package typically includes a plurality of computer programs, each designed to perform a different function or process. The computer programs (the called programs), can generally be called by another computer program (a calling program) that requires the function to be performed. In order to successfully perform a program call, the calling program must be able to supply the called program with the appropriate input (and, perhaps, output) parameters. Thus, the calling program can be required to know the function(s) performed and the parameter(s) required by the called program. If the calling program is not aware of the parameter(s) required, the calling program will be unable to successfully perform the program call.

As apparent from the above-described deficiencies, a need exists for an application program interface for a computer program, and a method and apparatus for interfacing with the computer program, such that a computer program can be used to perform a function, without regard to its location in either the front-end or the back-end of a computer system. Additionally, a need exists for an application program interface that can allow a computer program to be called, even when the calling program is not aware of the parameter(s) required by the called program.

SUMMARY OF THE INVENTION

One aspect of the present invention is directed to a computer program. The computer program is stored on a computer readable medium and is executable by a computer system. The computer system can have a front-end for interfacing with a user, and a back-end for performing batch functions. The computer program comprises instructions for performing a function, which requires at least one parameter for its operation. The computer program further comprises instructions for reading the parameter from a parameter cache in the computer system. The parameter cache is capable of storing the parameter as an object therein. The computer program also comprises instructions for validating the parameter and aborting the function if the parameter is not valid, and instructions for loading the parameter from the parameter cache and performing the function in accordance with the parameter if the parameter is valid.

The computer program can also comprise instructions for calling a subroutine for storing an output parameter in the parameter cache and instructions for supplying the subroutine with a keyword and a value associated with the output parameter. The subroutine can store the output parameter in the parameter cache in the form of a keyword/value pair.

BRIEF DESCRIPTION OF THE DRAWINGS

A more complete understanding of the present invention and its advantages will be readily apparent from the following Detailed Description of the Preferred Embodiments taken in conjunction with the accompanying drawings. Throughout the accompanying drawings, like parts are designated by like reference numbers and in which.

DETAILED DESCRIPTION OF THE PREFERRED EMBODIMENTS

Figure 1:
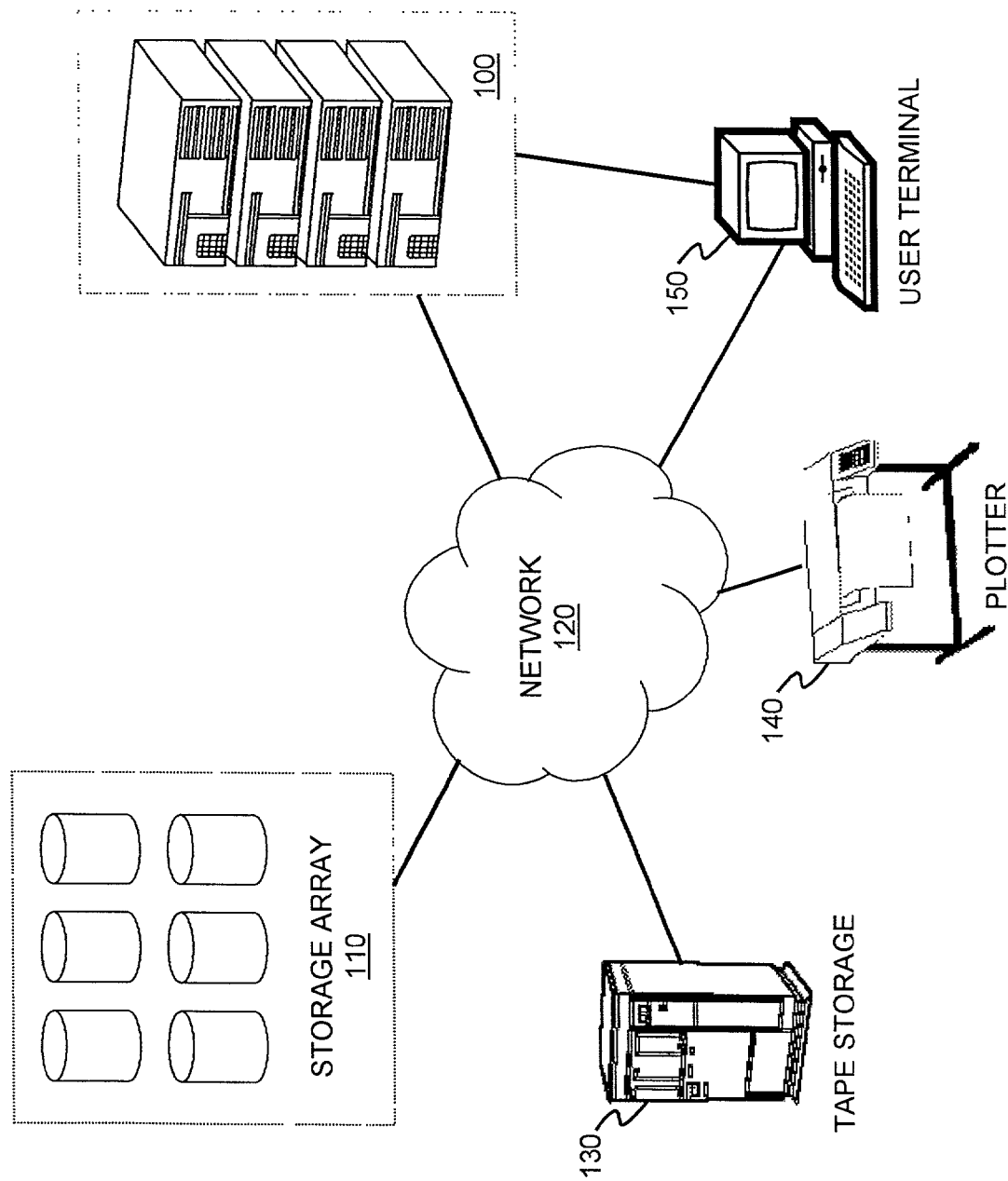
FIG. 1 is a schematic illustration of a computer network in accordance with the present invention.

FIG. 1 schematically illustrates a hardware environment of an embodiment of the present invention. A computer system 100 is connected to a storage array 110 via a communications network 120. A tape storage system 130 can be connected to the computer system 100 via the network 120 to provide for additional storage capability. A plotter 140, or other device for producing hardcopy displays, can also be connected to the computer system 100 via the network 120.

In a preferred embodiment, the computer system 100 is a multiprocessor supercomputer formed from a plurality of central processing units (CPUs), along with other ancillary elements. The computer system 100 can include, for example hundreds of commodity CPUs, which are capable of providing hundreds or thousands of megaflops (a megaflop is generally defined to be about one million floating point operations per second). Alternatively, the computer system 100 can be a personal computer, workstation, minicomputer, mainframe, or any combination thereof. The network 120 can be a private network, a public network, or any combination thereof, including local-area networks (LANs), wide-area networks (WANs), or the Internet.

In a preferred embodiment, the storage array 110 is a RAID (redundant array of independent disks) array capable of providing terabytes to petabytes of disk storage. The storage array 110 can include one or more hard disk drives, tape drives, solid state memory devices, or other types of storage devices.

The computer system 100 can be logically divided into a front-end portion and a back-end portion. The front-end includes a user interface, which can be provided at a terminal 150 (e.g., a personal computer). The terminal 150 can be directly connected to the computer system 100, or can be connected to the computer system 100 via the network 120. The front-end interface allows a user to build and submit processing jobs and access certain utilities. The processing jobs can then be submitted to a desired hardware platform (e.g., in the back-end).

In a preferred embodiment, wherein the computer system 100 includes a plurality of CPUs, a portion of the CPUs can be designated to perform the functions of the front-end portion, while another portion of the CPUs can be designated to perform the back-end data processing functions. Alternatively, in other embodiments wherein the computer system 100 is a personal computer, such as a laptop having a single CPU, the CPU can be capable of executing both the front-end code and the back-end code.

The computer system 100 can be used, for example, in numerical processing applications, such as seismic data processing and atmospheric modeling applications. In a preferred embodiment, the front-end portion of the computer system can be further divided into a front-end client portion and a front-end server portion The front-end client portion can interface with the user and make service requests of the front-end server, which fulfills the requests.

Processing jobs can be very complex, containing many calls to many process modules, a large number of parameter values, and other information related to the computer platform and the programming language used. In a preferred embodiment, both the front-end and the back-end of the computer system 100 are linked to libraries containing the process modules. Process modules are defined as the coding units which perform specific functions on data (e.g., seismic trace data) during the execution of the processing jobs. Examples of process modules (and their associated functions) include (1) TTRIN: Tape Trace Input, (2) TTROT: Tape Trace Output, (3) ABAL: Amplitude Balance, (4) ACORR: Autocorrelation, (5) ADNS: Add Noise, (6) FBAL: Frequency Balance, etc. Process modules can have subroutines, which are called by and are located within the same file as the process module.

A processing job can be run on the back-end of the computer system 100, for example, as a batch job. The processing job can be controlled by a "jobfile", which includes software written in a computing language for calling each of the process modules for execution. Further, the jobfile can include parameters required by each of the process modules. Building a "jobfile" for such jobs manually with a text editor can be a long, difficult, and error-ridden task. Therefore, a two-part process can be used to create the jobfile. A "workfile" containing all the required process modules can be created by the user, via the front-end. Once created, a parser can be used to generate the jobfile from the workfile. The jobfile can then be submitted to run on the back-end as a batch job.

Figure 2:
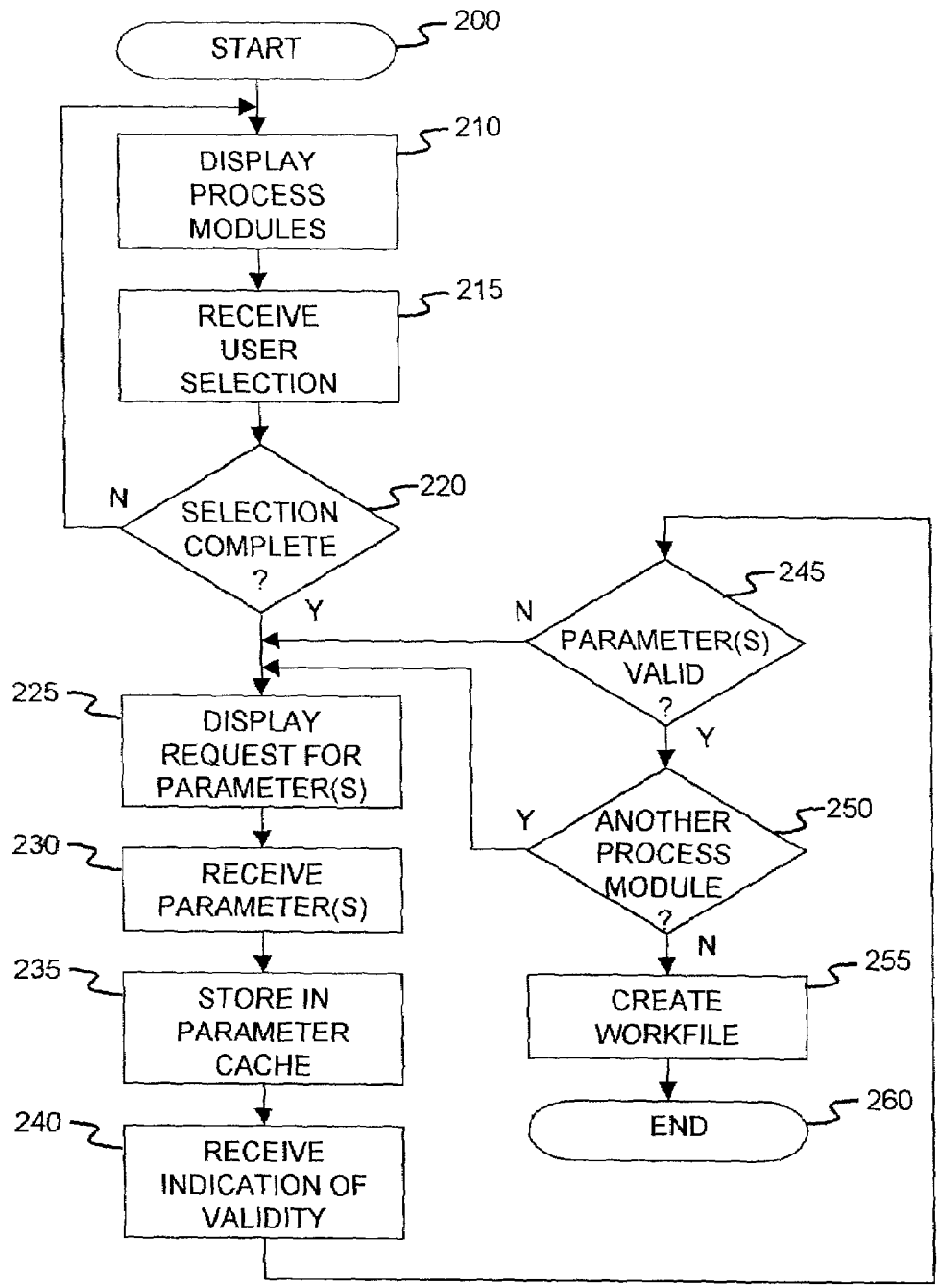
FIG. 2 is a flow diagram illustrating a process for building a processing job in accordance with the present invention.
Figure 3:
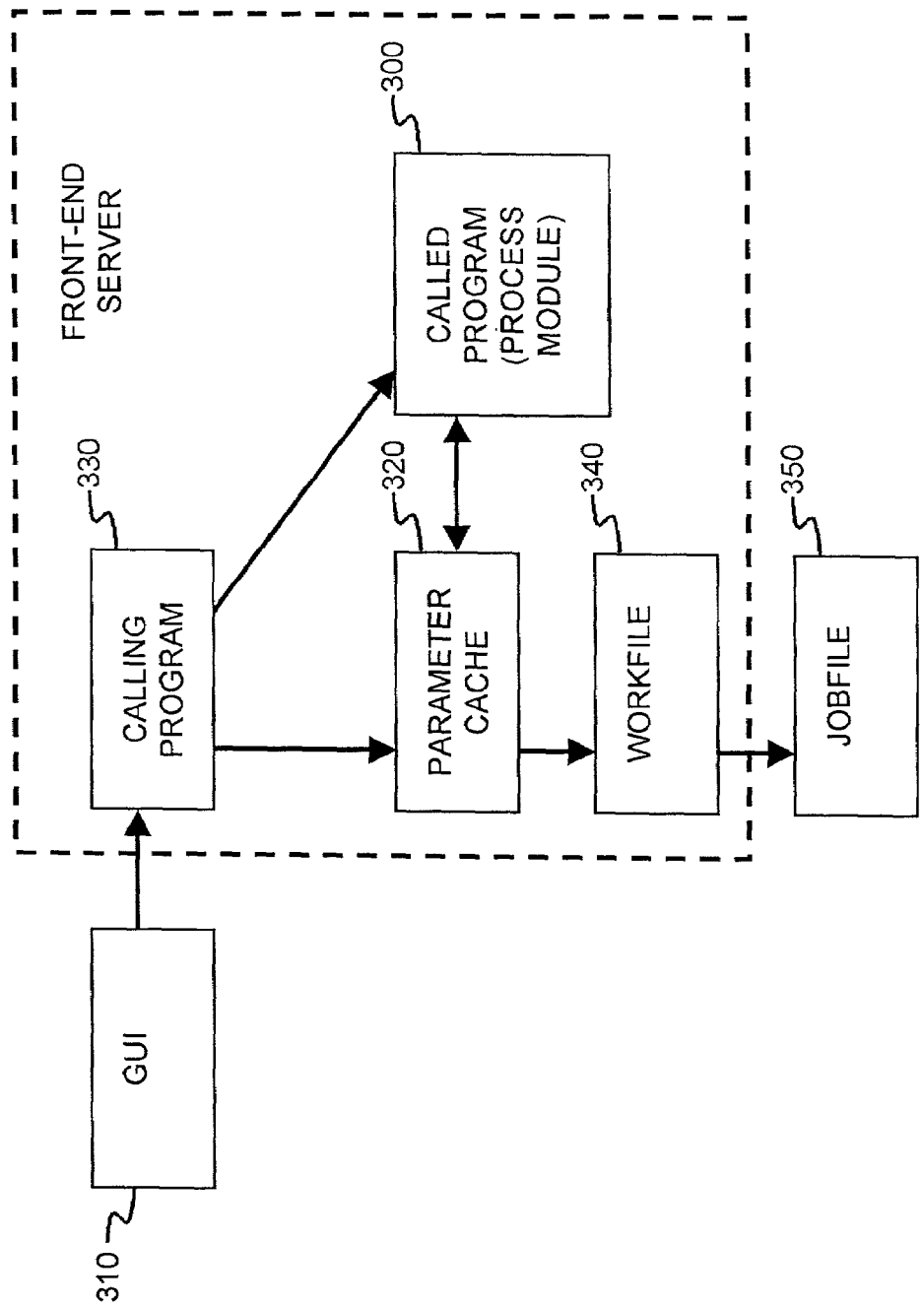
FIG. 3 is a block diagram illustrating the process for building the processing job in FIG. 2.

FIG. 2 illustrates a process for building a processing job in accordance with the present invention. FIG. 3 illustrates a block diagram associated with the process of building the processing job. The process starts in step 200. In step 210, the front-end client displays the available process modules 300 for selection by the user. In a preferred embodiment, the front-end client is implemented with a graphical user interface (GUI), including elements such as windows (pull-down, pop-up, file tab), toolbars, scroll bars, buttons, etc. The front-end client can receive the list of available process modules 300, for example, from the front-end server for display to the user via the GUI in the form of a scrollable list.

In step 215, the front-end client receives from the user a selection of the desired process modules 300. The user can select, in sequence, a plurality of process modules 300 to be executed, and can add or delete process modules 300 anywhere in the sequence. Once a sequence of process modules 300 has been selected and selection is complete (Yes in step 220), the process continues to step 225. If selection is not complete, step 210 is repeated wherein the user is again presented with a list of available process modules 300. The sequence of process modules 300 selected can include, for example: (1) TAPE TRACE INPUT, (2) AUTO CORRELATION, and (3) TAPE TRACE OUTPUT.

In step 225, the front-end client retrieves and displays a GUI screen 310 associated with the first process module 300 selected. The GUI screen 310 can request that the user enter parameter values required by the first process module 300. In this example, the first process module TAPE TRACE INPUT can require a plurality of parameters, including TAPE_NAME, which indicates a specific tape to be read, and #_TAPES, which indicates the number of tapes to be read, beginning with the tape specified by the TAPE_NAME parameter. As the user enters the values for the requested parameters, the front-end client receives the parameter values (step 230) and transmits the parameter values to the front-end server for storage in a parameter cache 320 (step 235). The front-end server (via a calling program 330) can store the parameters in the parameter cache 320, for example, by using a subroutine call (e.g., "put" parameter). In this example, the subroutine call can include a keyword (e.g., TAPE_NAME) and an associated value (e.g., "12345") indicating the name of the tape.

The parameter cache 320 is a memory area provided for storing process parameters, global parameters, and various parameters output by a process module. The parameters can be of any variable type, including integer, real, logical, character, double precision, etc. In this example, the parameter cache 320 is a memory area on the front-end server. The parameter cache 320 can be used for transferring parameters in a generic (i.e., non-process-specific) manner to and from a process module 300 (the called program) and the calling program 330, which can be the front-end, the back-end, another process module, or any other program. In this example, the calling program 330 is the front-end server. Since the process module 300 can access the parameter cache 320 directly (e.g., via a subroutine call), the calling program 330 is not required to pass any parameters to the process module 300.

Once stored in the parameter cache 320, the parameter values are accessible by and can be validated by the selected process modules 300. The process modules 300 are called (invoked) by the front-end server (the calling program 330). The process modules 300 are adapted to retrieve the parameters from the parameter cache 320 and to validate the parameters. For example, the first process module 300, TAPE TRACE INPUT, can be run in the front-end server to retrieve the parameter values associated with the parameters TAPE_NAME and #_TAPES from the parameter cache 320, validate the parameter values and to return an indication of the validity of the parameter values to the front-end client. The process module 300 TAPE TRACE INPUT can retrieve the parameters from the parameter cache 320, for example, by using a subroutine call (e.g., "get" parameter). In this example, the subroutine call includes the keyword TAPE_NAME. The subroutine will return the value associated with the keyword TAPE_NAME, (e.g., "12345") indicating the name of the tape. The keyword/value pair can be stored in the parameter cache 320 as an object, which is accessible to the process module 300.

The parameter cache 320 advantageously allows the selected process modules 300 to access the parameter values without the need to interface with the user or the GUI 310. Thus, the parameter cache 320 advantageously eliminates any platform, language, or implementation dependency between the process module 300, which runs on the front-end server, and the front-end client interface. A new front-end client can therefore be implemented without breaking any existing implementations of the front-end server, an especially important feature in today's rapidly changing technology.

Further, the parameter cache 320 advantageously allows a computer program running on the front-end server (the calling program 330) to call the selected process modules 300 without the requirement to supply the called process modules 300 with any parameters. This is in contrast to conventional computer systems, wherein a calling program is required to supply a called program with the appropriate input and output parameters.

Validation of the parameter TAPE_NAME can include, for example, determining whether the parameter value entered corresponds to a tape in a tape library. Validation of the parameter #_TAPES can include, for example, verification that the number of tapes entered is not equal to zero or a negative number. The front-end client receives the indication of validity in step 240. If all the parameters are valid (Yes in step 245), the process continues to step 250. If any of the parameters are not valid (No in step 245), step 225 is repeated and the user is requested to re-enter the parameters. In a preferred embodiment, the user entry fields of the GUI 310 retains the latest valid user entry. Thus, the user need not re-enter any parameters that have already been determined by the process module 300 to be valid.

Once the parameters associated with a selected process module 300 has been entered and validated, a determination is made as to whether there are other process modules 300 remaining that require parameters to be entered. In this example, the parameters associated with the first selected process module TAPE TRACE INPUT have been entered. Parameters associated with the other selected process modules AUTOCORRELATION and TAPE TRACE OUTPUT have yet to be entered. Thus, (Yes in step 250) the front-end client returns to step 225 to retrieve and display a GUI screen 310 associated with the next process module 300 in the sequence, in this example, the AUTOCORRELATION process module.

Once parameters have been entered for all the selected process modules 300 (No in step 250), the process continues to step 255 wherein a workfile 340 is created. The workfile 340 contains a sequence of process modules 300 to be executed, the parameter values associated with each of the process modules 300, and other parameter values appropriate to the job. In creating the workfile 340, the parameters are retrieved from the parameter cache 320. The process then ends in step 260.

The workfile 340 is preferably a text file that can be edited with a text editor and can be used as a template to create new workfiles. For instance, the user can edit an existing workfile 340 to modify parameter values associated with the selected processes. While the illustrated embodiment shows the workfile 340 being created after all the parameters for all of the selected process modules 300 have been entered and validated, in other embodiments, a portion of the workfile 340 can be written after all the parameters for a particular process module 300 have been entered and validated. For example, as the user leaves a parameter entry screen for a particular process module 300, the parameters entered for that process module 300 can be written to the workfile 340. In a preferred embodiment, the parameters are flushed (deleted) from the parameter cache 320 after being written to the workfile 340.

The information in the workfile 340 can then be used by a job builder application to produce the jobfile 350, which is capable of running on a selected computer system (on the back-end). The jobfile 350 directs the execution of the job to produce the desired result. Once the jobfile 350 has been built, it can then be submitted to the desired hardware platform on the back-end to run as a batch process. Like the workfile 340, the jobfile 350 is preferably a text file that can be edited with a text editor to create new jobfiles. In a preferred embodiment, the jobfile 350 contains instructions, executable by the back-end portion of the computer system 100, for calling the various process modules 300 for execution. The jobfile 350 also preferably contains the parameters required by each of the process modules 300, for example, in the form of card images. A card image can be, for example, a single line of ASCII text, 80 characters long, containing a keyword and an associated value. In the example of the TAPE TRACE INPUT process module, a card image for the parameter TAPE_NAME can include a keyword TAPE_NAME, along with an associated value (e.g., "12345"). A card image for the parameter #_TAPE can include a keyword NUMBER, along with an associated value "2" indicating trace input is to be performed from 2 tapes.

The back-end portion of the computer system 100 manages and communicates with the various process modules during the execution of the processing jobs. In a preferred embodiment, a particular process module for performing a particular function, (e.g., TAPE TRACE INPUT) can be written in a high-level computing language (e.g., Fortran90, C, C++) that can be compiled to run on both the front-end server and the back-end. Different compilers can be used, for example, due to differences in the computing architectures of the front-end and the back-end. For example, if the computing architecture of the front-end is different from the computing architecture of the back-end, a first compiler can be used to compile the TAPE TRACE INPUT process module into a first set of executable code for running on the front-end, while a second compiler can be used to compile the same process module into a second set of executable code for running on the back-end. Since the process modules are adapted to transfer parameters to and from the parameter cache, the process modules can be used in any platform or environment, subject to the availability of the parameter cache.

A plurality of such process modules, each performing a different function, can be packaged together to form a complete software package. Since the same process module (computer program) can be compiled, by the same compiler or by different compilers, to run on both the front-end and the back-end, a programmer or system maintainer of the software package thus has only one source code file to modify when a change is desired to be made to one of the process modules in the software package. In a particularly advantageous embodiment, the process modules can be written such that it is system independent, to allow for the computer programs to be used in diverse coding environments without requiring the source code to be rewritten.

Figure 4:
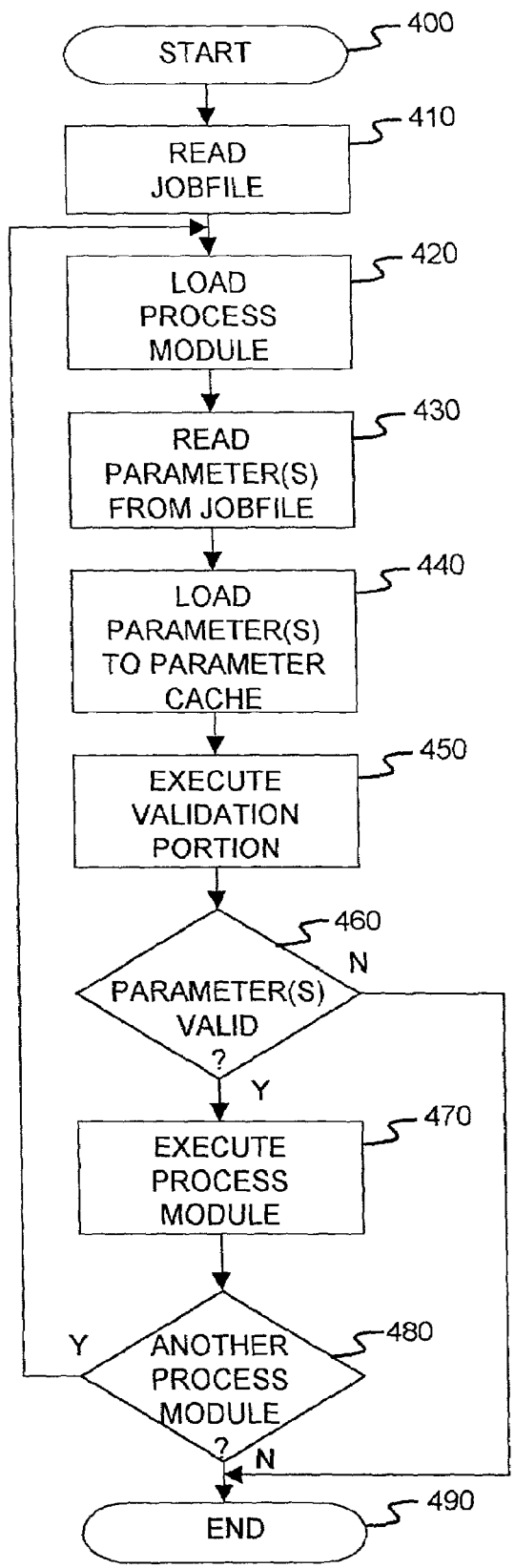
FIG. 4 is a flow diagram illustrating a process for running a processing job in accordance with the present invention.
Figure 5:
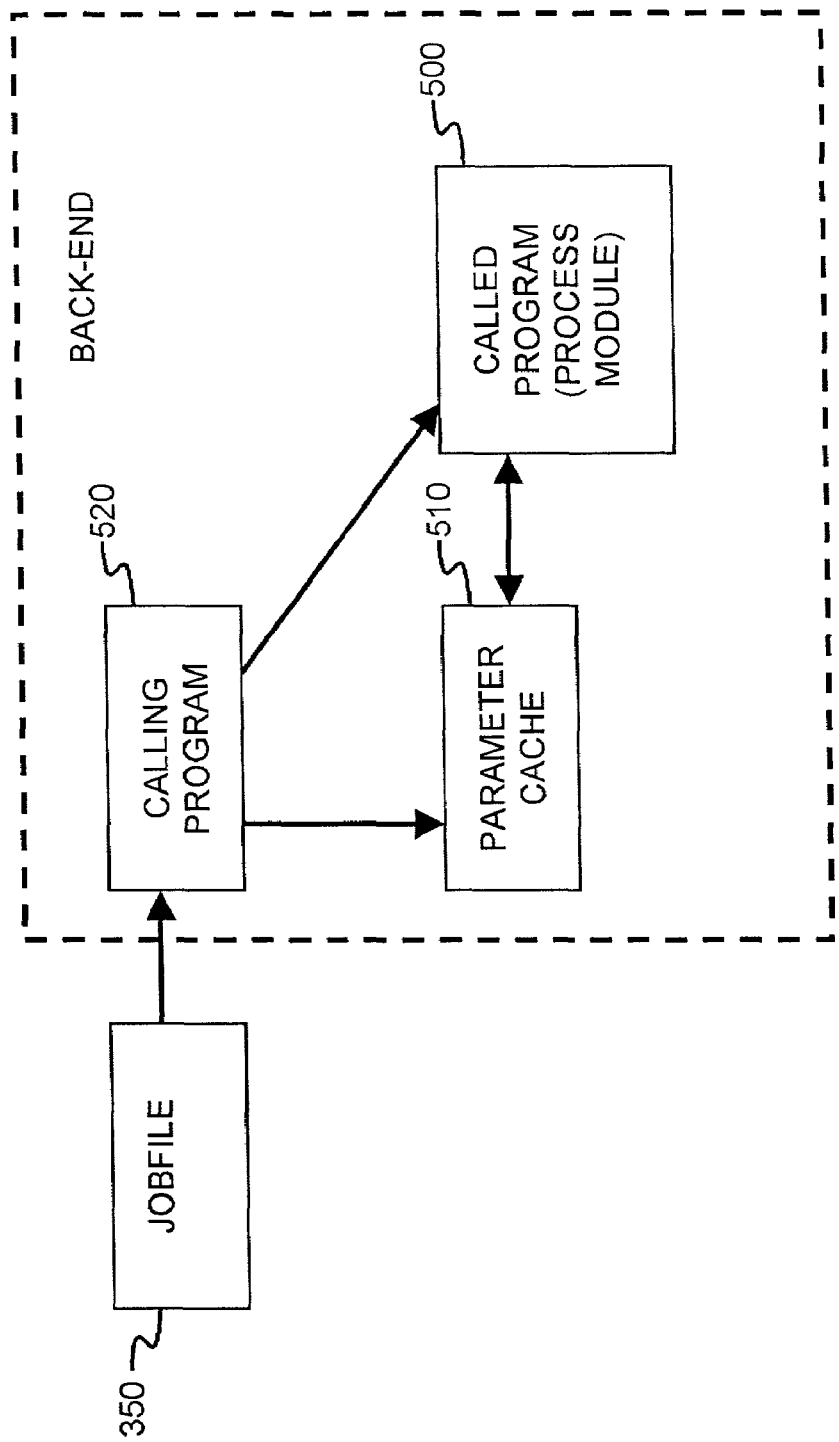
FIG. 5 is a block diagram illustrating the process for running the processing job in FIG. 4.

FIG. 4 illustrates a process for running a processing job in the back-end portion of the computer system 100 in accordance with the present invention. FIG. 5 illustrates a block diagram for running the processing job. In a preferred embodiment, the back-end is designed to run the processing job as a batch operation.

The process starts in step 400. In step 410, the back-end portion of the computer system 100 reads in a jobfile 350, containing at least a listing of a plurality of process modules to be performed, and the parameters associated with each of the process modules. The parameters can be stored, for example, in the form of card images in the job file 350. In step 420, the jobfile 350 is executed and loads a first one of the process modules 500. In a preferred embodiment, the process module 300 illustrated and described above with respect to FIGS. 2 and 3, and the process module 500 originate from the same source code file. However, the process modules 300, 500, can have different executable forms, depending on the compilers used and the architecture of the particular computer systems for which the particular process module is compiled. Then, in step 430, the parameters associated with the process module 500 are read. The parameters associated with the process module 500 are then loaded into a parameter cache 510 in step 440. Thus, the parameters that are loaded to the parameter cache 510 in the back-end are included in the jobfile 350, which was created in the front-end.

As in the front-end, the parameter cache 510 is a memory area provided for storing process parameters, global parameters, and various parameters output by a process module 500. The parameter cache 510 can be used for transferring parameters in a generic (i.e., non-process-specific) manner to and from a process module 500 and the calling program 520, which can be the front-end, the back-end, another process module, or any other program. In this example, the calling program 520 is the jobfile 350 running on the back-end portion of the computer system 100. The parameter cache 510 preferably stores the parameter values as objects, in the form of a keyword/value pair, including a keyword and value associated with the keyword (e.g., Keyword=Parameter Value). The objects can thus be addressed by the process modules by the keyword.

Then, in step 450, the process module 500 is invoked and used to validate the parameters. If the parameters are valid (Yes in step 460), the process module 500 loads the parameters. Consider, for example, the TAPE TRACE INPUT process module discussed above. If the parameters TAPE_NAME and #_TAPES are valid, the TAPE TRACE INPUT process module will continue to execute (step 470), by loading the parameter values and, using the parameter values, retrieve the appropriate tape(s) and inputting the data from the tape(s) into memory. Otherwise, if the parameters are not valid (No in step 460), the process ends at step 490 and the entire job is stopped.

In step 480, the batch program determines whether there remains more process modules 500 to be executed. If so, (Yes in step 480), the process returns to step 420 wherein the next process module 500 is loaded in accordance with the jobfile 350. If no more process modules 500 remain to be executed (No in step 480), the process ends at step 490.

Thus, while in conventional computer programs, the calling program is required to supply the called programs with the necessary parameters, the present invention advantageously allows the calling program (the jobfile, in this example) to call the process modules without supplying the process modules with the required parameters. The process modules of the present invention are able to access the parameter cache and to transfer any required parameters to and from the parameter cache. The process modules of the present invention are thus able to load any output parameters to the parameter cache for use by other process modules.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A computer program, stored on a computer readable medium and executable by a computer system, the computer program comprising:
   instructions for invoking a function from a plurality of functions to be executed, at least one of said plurality of functions requiring a parameter, said plurality of functions and said parameter being stored in a parameter cache in said computer system;

instructions for calling a subroutine for reading said parameter;

instructions for supplying said subroutine with a keyword/value pair associated with said parameter;

instructions for receiving said parameter from said subroutine;

instructions for reading said parameter from said parameter cache;

instructions for validating said parameter;

instructions for aborting said function if said parameter is not valid;

instructions for loading said parameter from said parameter cache and performing said function in accordance with said parameter if said parameter is valid; and instructions for repeating the preceding instructions for each plurality of functions stored in parameter cache.

2. A computer program in accordance with claim 1, wherein said computer program is adapted for running on both a front-end and a back-end of a computer system.

3. A computer program in accordance with claim 2, wherein said computer program is adapted to be compiled by a first compiler to create a first set of executable code for running on said front-end and by a second compiler to create a second set of executable code for running on said back-end.

4. A computer program, stored on a computer readable medium and executable by a computer system, the computer program comprising:

instructions for invoking a function from a plurality of functions to be executed, at least one of said plurality of functions requiring a parameter, said plurality of functions and said parameter being stored in a parameter cache in said computer system;

instructions for calling a subroutine for storing an output parameter in said parameter cache;

instructions for supplying said subroutine with a keyword and a value associated with said output parameter, said subroutine storing said output parameter in said parameter cache in the form of a keyword/value pair;

instructions for reading said parameter from said parameter cache;

instructions for validating said parameter;

instructions for aborting said function if said parameter is not valid;

instructions for loading said parameter from said parameter cache and performing said function in accordance with said parameter if said parameter is valid; and instructions for repeating the preceding instructions for each plurality of functions stored in parameter cache.

5. A method of operating a computer system, the method comprising steps of:

invoking a function from a plurality of functions to be executed, at least one of said plurality of functions requiring a parameter, said plurality of functions and said parameter being stored in a parameter cache in said computer system;

supplying said subroutine with a keyword/value pair associated with said parameter;

receiving said parameter from said subroutine;

storing said parameter in said parameter cache;

calling a subroutine for reading said parameter from said parameter cache in said computer system;

validating said parameter;

aborting said function if said parameter is not valid;

loading said parameter from said parameter cache and performing said function in accordance with said parameter if said parameter is valid; and repeating the preceding steps for each plurality of functions stored in parameter cache.

6. A method of operating a computer system, the method comprising the steps of:

invoking a function from a plurality of functions to be executed, at least one of said plurality of functions requiring a parameter, said plurality of functions and said parameter being stored in a parameter cache in said computer system;

calling a subroutine for storing an output parameter in said parameter cache;

supplying said subroutine with a keyword and a value associated with said output parameter, said subroutine storing said output parameter in said parameter cache in the form of a keyword/value pairs;

reading said parameter from said parameter cache in said computer system;

validating said parameter;

aborting said function if said parameter is not valid;

loading said parameter from said parameter cache and performing said function in accordance with said parameter if said parameter is valid, and repeating the preceding steps for each plurality of functions stored in parameter cache.

7. A computer program, stored on a computer readable medium and executable by a computer system, the computer program comprising:

(a) instructions for calling a subroutine for storing at least one of said plurality of parameters in a parameter cache on said computer system;

(b) instructions for supplying said subroutine with a keyword associated with said parameter;

(c) instructions for supplying said subroutine with a value associated with said parameter;

(d) instructions for receiving a job file containing a plurality of processes to be executed and a plurality of parameters, a portion of said plurality of parameters being associated with at least one of said plurality of processes;

(e) instructions for loading one of said plurality of processes;

(f) instructions for executing said one of said plurality of processes thus loaded, said one of said plurality of processes including instructions for reading a parameter from said portion of said plurality of parameters being associated therewith from said parameter cache, instructions for validating said parameter, and instructions for terminating said computer program if said parameter is not valid; and (g) instructions for repeatedly performing instructions (e) through (f) in accordance with said job file until all of said plurality of processes in said job file has been executed unless said computer program is terminated by one of said plurality of processes.

8. A computer program, stored on a computer readable medium and executable by a computer system, the computer program comprising:

(a) instructions for calling a subroutine for reading said parameter;

(b) instructions for providing said subroutine with a keyword associated with said parameter;

(c) instructions for supplying said subroutine with a value associated with said parameter;

(d) instructions for receiving said parameter from said subroutine;

(e) instructions for storing at least one of said plurality of parameters in a parameter cache on said computer system, wherein said at least one of said plurality of parameters is stored in said parameter cache in the form of a keyword/value pair;

(f) instructions for receiving a job file containing a plurality of processes to be executed and a plurality of parameters, a portion of said plurality of parameters being associated with at least one of said plurality of processes;

(g) instructions for loading one of said plurality of processes;

(h) instructions for executing said one of said plurality of processes thus loaded, said one of said plurality of processes including instructions for reading a parameter from said portion of said plurality of parameters being associated therewith from said parameter cache, instructions for validating said parameter, and instructions for terminating said computer program if said parameter is not valid; and (i) instructions for repeatedly performing instructions (g) through (h) in accordance with said job file until all of said plurality of processes in said job file has been executed unless said computer program is terminated by one of said plurality of processes.

9. A method, performed by a computer system, comprising the steps of:

(a) receiving a job file containing a plurality of processes to be executed and a plurality of parameters, a portion of said plurality of parameters being associated with at least one of said plurality of processes;

(b) calling a subroutine for storing at least one of said plurality of parameters in a parameter cache on said computer system, wherein said parameter is stored in said parameter cache in the form of a keyword/value pair;

(c) supplying in said subroutine with a keyword associated with said parameter;

(d) supplying said subroutine with a value associated with said parameter;

(e) loading one of said plurality of processes;

(f) executing said one of said plurality of processes thus loaded, said one of said plurality of processes including instructions for reading a parameter of said portion of said plurality of parameters being associated therewith from said parameter cache, instructions for validating said parameter, and instructions for terminating said computer program if said parameter is not valid; and (g) repeatedly performing steps (e) through (f) in accordance with said job file until all of said plurality of processes in said job file has been executed unless said computer program is terminated by one of said plurality of processes.

10. A method, performed by a computer system, comprising the steps of:

(a) receiving a job file containing a plurality of processes to be executed and a plurality of parameters, a portion of said plurality of parameters being associated with at least one of said plurality of processes;

(b) storing at least one of said plurality of parameters in a parameter cache on said computer system, wherein said parameter is stored in said parameter cache in the form of a keyword/value pair;

(c) loading one of said plurality of processes;

(d) executing said one of said plurality of processes thus loaded, said one of said plurality of processes including instructions for calling a subroutine for reading a parameter of said portion of said plurality of parameters being associated therewith from said parameter cache, instructions for validating said parameter, and instructions for terminating said computer program if said parameter is not valid; and (e) repeatedly performing steps (c) through (d) in accordance with said job file until all of said plurality of processes in said job file has been executed unless said computer program is terminated by one of said plurality of processes, instructions for receiving a job file containing a plurality of processes to be executed and a plurality of parameters, a portion of said plurality of parameters being associated with at least one of said plurality of processes.

11. A computer program, stored on a computer readable medium and executable by a computer system, the computer program comprising:

instructions for inputting a plurality of functions to be executed, at least one of said plurality of functions requiring at least one parameter;

instructions for inputting a parameter and for storing said plurality of functions, and said parameter in a parameter cache;

instructions for invoking a function from said plurality of functions, said function requiring at least one parameter;

instructions for supplying said subroutine with a keyword/value pair associated with said parameter;

instructions for receiving said parameter from said subroutine;

instructions for calling a subroutine for reading said parameter from said parameter cache;

instructions for validating said parameter;

instructions for aborting said function if said parameter is not valid; and instructions for loading said parameter from said parameter cache and performing said function in accordance with said parameter if said parameter is valid.

12. A computer program, stored on a computer readable medium and executable by a program system, the computer program comprising:

instructions for selecting one or more functions, said functions requiring at least one or more parameters;

instructions for selecting one or more parameters and for storing said parameters in a parameter cache, wherein said parameter is stored in said parameter cache in the form of a keyword/value pair;

instructions for invoking one of said functions, said one of said functions requiring one or more associated parameters;

instructions for calling a subroutine for reading said one or more parameters from said parameter cache;

instructions for supplying said subroutine with a keyword/value pair associated with said parameter;

instructions for receiving said parameter from said subroutine;

instructions for validating one or more parameters as being said associated parameters;

instructions for aborting said one of said function(s) if said parameters do not include all of said associated parameters required by said one of said function(s); and instructions for loading said associated parameters from said parameter cache and performing said one of said functions in accordance with said one or more associated parameters.

13. A computer program, stored on a computer readable medium and executable by a computer system, the computer program comprising:

(a) instructions for receiving input from the user to build a job file containing a plurality of processes to be executed and a plurality of parameters, a portion of said plurality of parameters being associated with at least one of said plurality of processes;
(b) instructions for storing at least one of said plurality of parameters in a parameter cache on said computer system;
(c) instructions for loading one of said plurality of processes;
(d) instructions for executing said one of said plurality of processes thus loaded, said one of said plurality of processes including instructions for calling a subroutine for reading a parameter from said portion of said plurality of parameters being associated therewith from said parameter cache;
(e) instructions for supplying said subroutine with a keyword associated with said parameter;
(f) instructions for receiving said parameter from said subroutine;
(g) instructions for validating said parameter, and instructions for terminating said computer program if said parameter is not valid; and
(h) instructions for repeatedly performing instructions (c) through (d) in accordance with said job file until all of said plurality of processes in said job file has been executed unless said computer program is terminated by one of said plurality of processes.

* * * * *

UNITED STATES PATENT AND TRADEMARK OFFICE
CERTIFICATE OF CORRECTION

PATENT NO. : 7,076,780 B2 Page 1 of 1
APPLICATION NO. : 09/951184
DATED : July 11, 2006
INVENTOR(S) : Charles Carroll Burch, Jr. et al.

It is certified that error appears in the above-identified patent and that said Letters Patent is hereby corrected as shown below:

Column 10, line 15, please delete "pairs" and insert --pair--
Column 11, line 35, please delete "in"

Signed and Sealed this

Sixth Day of March, 2007

JON W. DUDAS
*Director of the United States Patent and Trademark Office*